Jan. 19, 1954  A. H. BEEKEN  2,666,465
DEVICE FOR HUSKING COCONUTS
Filed Oct. 15, 1951  5 Sheets—Sheet 1

INVENTOR.
ARNOLD H. BEEKEN
BY
ATTORNEYS

Jan. 19, 1954  A. H. BEEKEN  2,666,465
DEVICE FOR HUSKING COCONUTS
Filed Oct. 15, 1951  5 Sheets-Sheet 2

INVENTOR.
ARNOLD H. BEEKEN
BY
Arnold and Mathus
ATTORNEYS

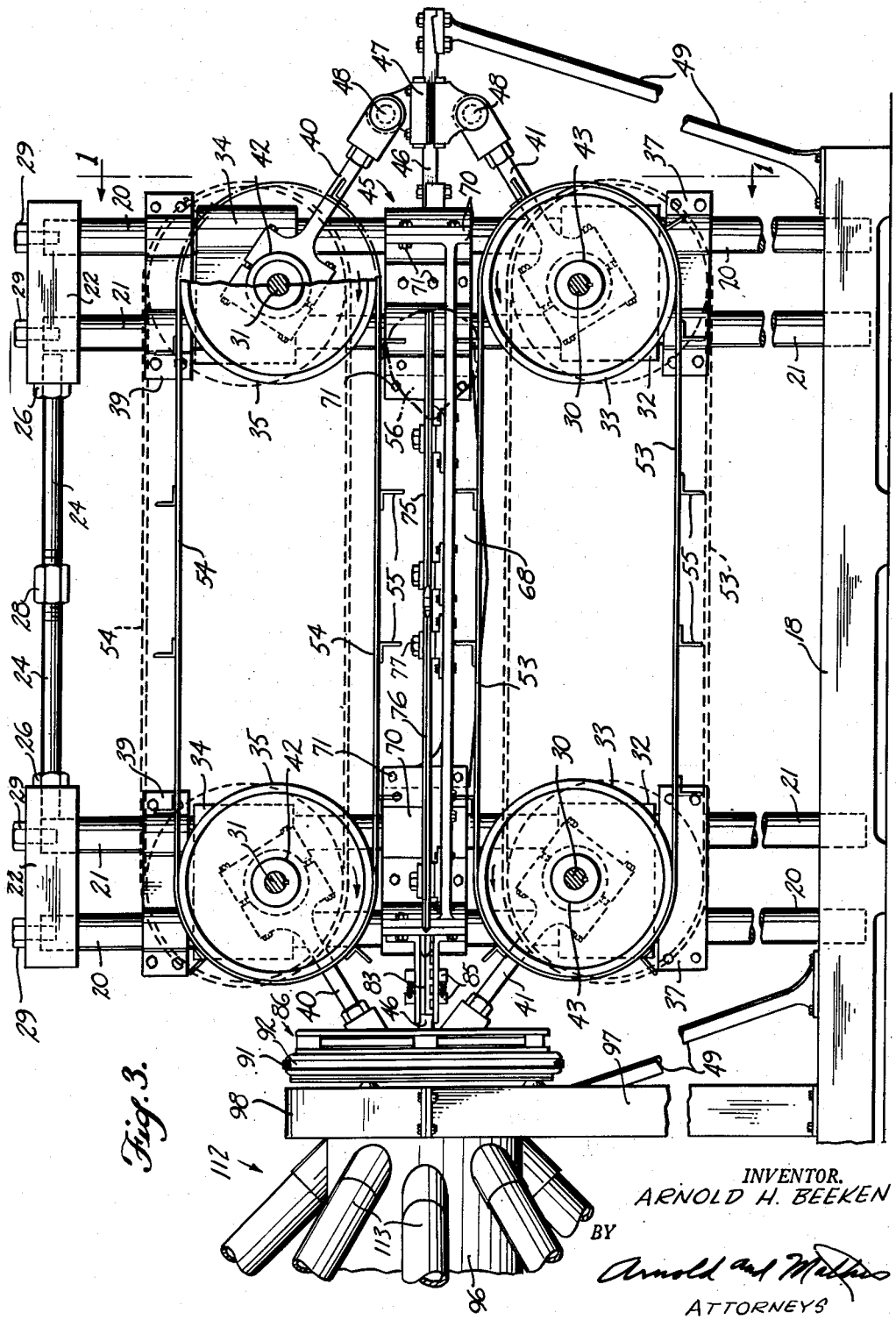

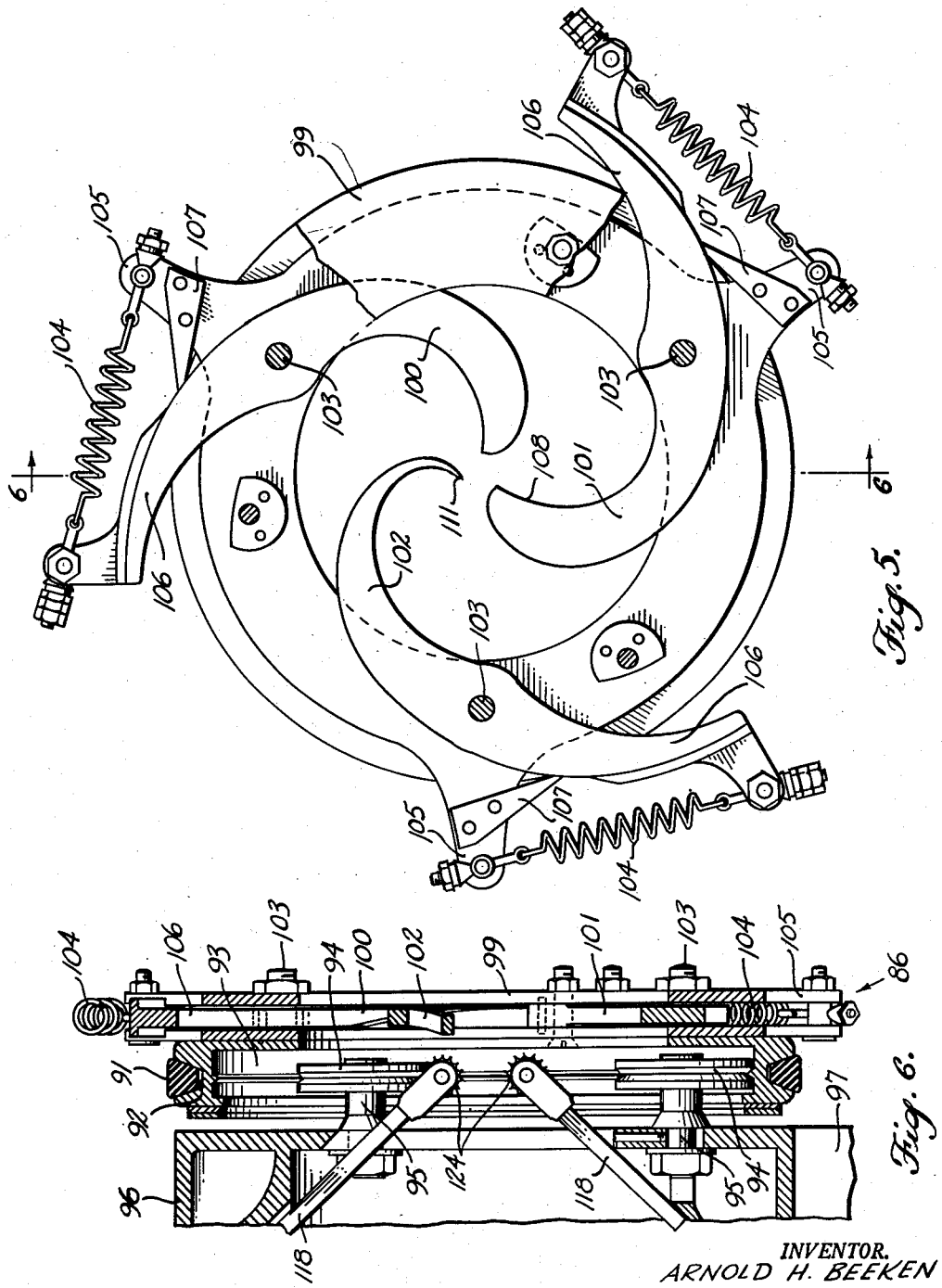

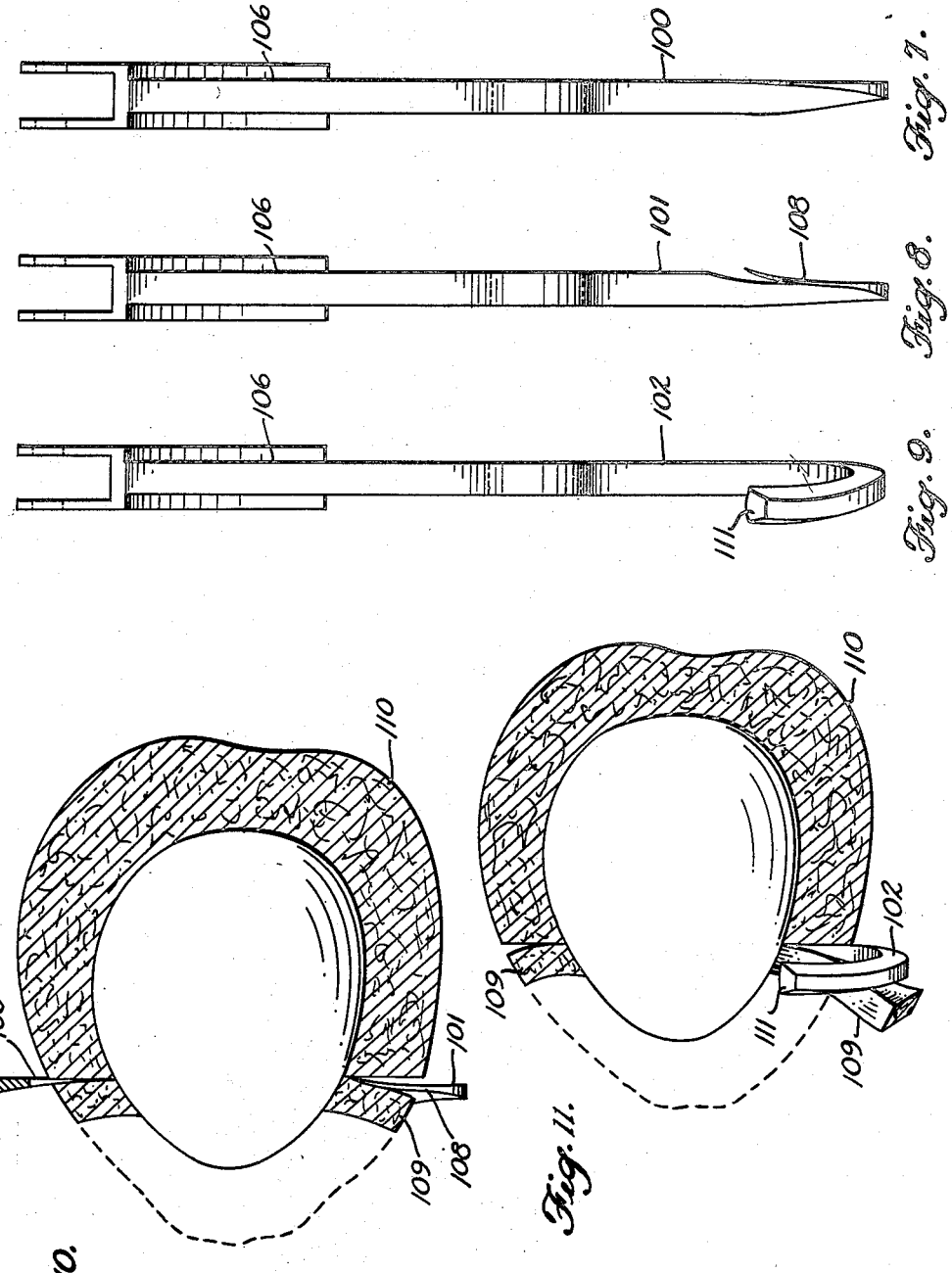

Patented Jan. 19, 1954

2,666,465

UNITED STATES PATENT OFFICE 2,666,465

DEVICE FOR HUSKING COCONUTS

Arnold H. Beeken, Tacoma, Wash.

Application October 15, 1951, Serial No. 251,289

6 Claims. (Cl. 146—7)

My invention relates to the art of paring or peeling the husks from the hard shell of a coconut. More particularly, my invention relates to a device for mechanically holding a coconut while the husk is mechanically pared or peeled in helical convolutions from the hard shell of a coconut.

Heretofore, coconuts have been pared of their husks by native labor and a rather long tedious task was involved in each instance. However, due to the relatively low cost of native labor and the lack of a suitable mechanical substitute, this art has not heretofore progressed to a point where the dehusking of coconuts has been mechanized.

It is an object of my invention to provide mechanical means to hold a coconut while the coconut is being mechanically dehusked. Another object of my invention is to provide a helical cut path in the coconut husk; then to turn or break the helical strip away from the remaining husk portion of the coconut, and then to provide cutter means to cut away, scrape or remove said helical strip.

Another object of my invention is to provide knife-like holding means which will cut through and thereby engage a coconut husk and thus provide coconut holding means functioning at the time the coconut hard shell is being pared or peeled of its husk.

Another object of my invention is to provide such knife-like holding means which are operable to sequentially handle without prior segregation or sorting coconuts of varying sizes.

Another object of my invention is to provide novel conveyor means of a nature and character which tend to conform to and positively urge a coconut through the coconut holding means as well as through and past the coconut dehusking means.

Another object of my invention is to provide coconut centering and holding means in the nature of a plurality of slidably mounted rods having thereon rotatably mounted toothed wheel coconut holding means.

Another object of my invention is to provide toothed wheeled coconut holding means which function to center the coconuts, to resist forward motion of the coconuts, and prevent coconuts from turning as the same are subjected to rotary cutting knives.

Another object of my invention is to provide means to hold the advancing end portion, as well as the trailing end portion, of a coconut while the midportion thereof is being dehusked.

Other objects and advantages of my invention will become apparent as the description of the same proceeds, and the invention will be best understood from a consideration of the following detailed description taken in connection with the accompanying drawings forming a part of the specification with the understanding, however, that the invention is not to be limited to the exact details of construction shown and described since obvious modifications will occur to those skilled in the art.

In the following drawings, like reference numerals will indicate like parts.

Fig. 3 is a view in side elevation, with parts removed and parts broken away in the interest of clarity and taken substantially on broken line 3—3 of Fig. 2;

Fig. 4 is a fragmentary sectional view taken substantially on broken line 4—4 of Fig. 2;

Fig. 5 is a fragmentary detached view in end elevation of peeling mechanism embodying my invention;

Fig. 6 is a sectional view, with parts in elevation, taken substantially on broken line 6—6 of Fig. 5;

Figs. 7, 8, and 9 are views in elevation of peeling knives employed in my invention;

Fig. 10 is a detached fragmentary view of a coconut in section, indicating only the husk and the hard shell, and illustrating the operational effects of the knives shown in Figs. 7 and 8 of the drawings; and Fig. 11 is a view similar to Fig. 10 of the drawings, showing toward the upper portion thereof the results of the cutter knives shown in Figs. 7 and 8 of the drawings and illustrating in a perspective manner the results of the cutter knife shown in Fig. 9 of the drawings.

Figure 1:
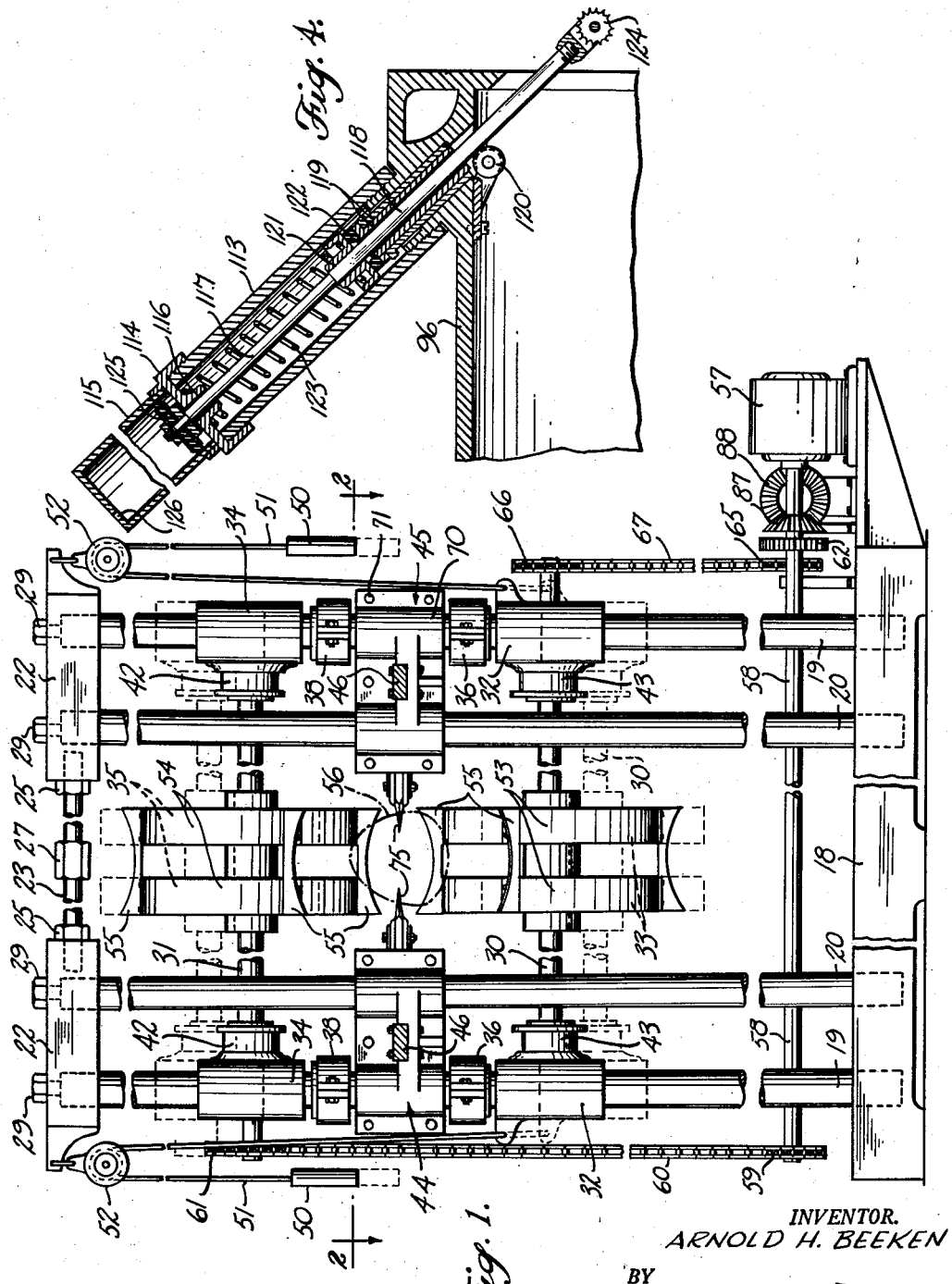
Figure 1 is a view in end elevation, with parts removed and parts broken away in the interest of clarity, and taken substantially on broken line 1—1 of Fig. 3, showing a device embodying my invention.
Figure 2:
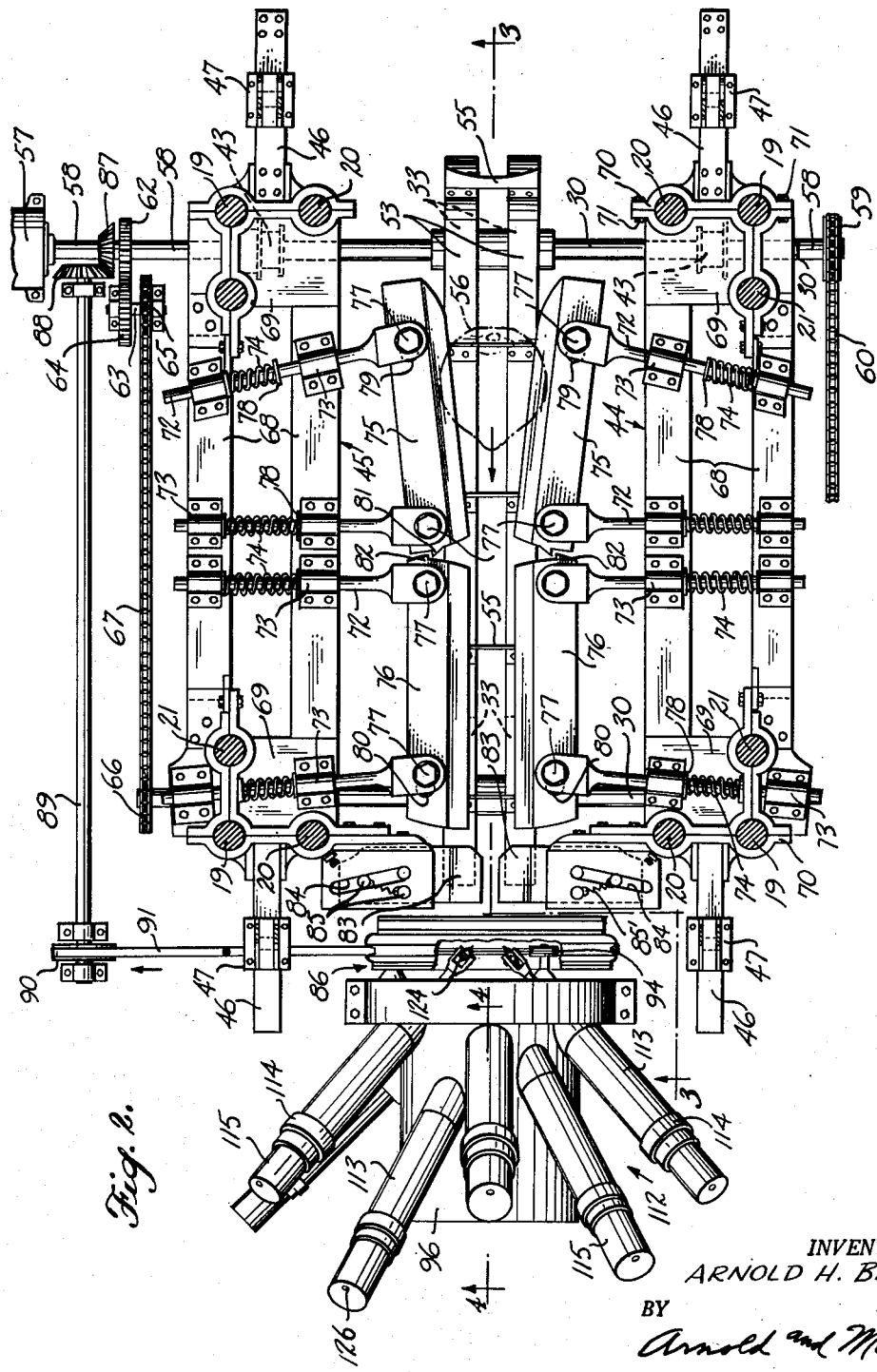
Fig. 2 is a plan view, with parts removed in the interest of clarity and taken substantially on broken line 2—2 of Fig. 1.

Referring now to Figs. 1, 2, and 3 of the drawing, a structural base frame 18 is provided and supports a plurality of guide rods 19, 20, 21. The guide rods 19, 20, and 21 are secured together at their upper portions by structural members 22, end tie rods 23, side tie rods 24, nuts 25 and 26, and nuts 27 and 28. Opposed structural members 22 are right and left hand threaded to threadedly engage threaded portions on the ends of tie rods 23 and on the ends of side tie rods 24. Furthermore, the end tie rods 23 and side tie rods 24 engage nuts 27 and 28. Thus, turning of rods 23 in an appropriate direction tends to bring the structural members 22 toward or away from each other, considered cross-wise of the machine. Turning of the rods 24 in an appropriate direction tends to bring the structural members 22 toward or away from each other, longitudinally considered of the machine. After a desired adjustment is obtained, it may be fixed by lock nuts 25 and 26.

Each structural member 22 is provided with recesses which slidably interfit with guide rods 19, 20, and 21. Also, cap screws 29 secure each of the corner structural members 22 to the guide rods 19, 20, and 21. Thus a structural member or supporting apparatus of my invention comprises base frame 18, guide rods 19, 20, and 21, corner structural members 22, end tie rods 23, side tie rods 24, nuts 25 to 28, and cap screws 29. Obviously, other structural frame means may be provided which will include the guide rods 19, 20, and 21 or their equivalents. Preferably, three guide rods are provided at each corner of the device but obviously, the number thereof may be changed.

Four driven cross-shafts are provided and the lower thereof are given the number 30 while the upper thereof are given the number 31. Each of the lower cross-shafts 30 is rotatably supported by slides or sleeves 32. Each of the sleeves 32 is slidably mounted on guide rods 19 and 21. Each driven shaft 30 mounts spaced apart wheels or pulleys 33.

Referring now to upper cross-shafts 31 the end portions of the same are rotatably mounted in sleeves 34 and sleeves 34 in turn, are slidably mounted on guide rods 19 and 21. Each of the upper cross-shafts 31 fixedly mounts spaced apart pulleys or wheels 35.

Upward movement of sleeves 32 and in turn each driven shaft 30 is arrested by stops 36 (see Fig. 1) mounted on guides 19 and 21 and downward movement thereof is arrested by stops 37 (see Fig. 3) also mounted on guides 19 and 21. Similarly, downward movement of the sleeves 34 and in turn the driven shafts 31 is arrested by stops 38 (see Fig. 1) mounted on guides 19 and 21, and upward movement thereof is arrested by stops 39 (see Fig. 3). In the interest of clarity of the drawings the stops 36 to 39 inclusive are not shown on all of the figures.

The shafts 30 and 31 at the respective ends of the machine are articulated so as to provide controlled movement toward and away from each other. Such mechanism may employ upper connecting rods 40 and lower connecting rods 41. There will be four connecting rods 40 and four connecting rods 41. One end portion of each connecting rod 40 is journalled in a bearing 42 (see Fig. 1) and one end portion of each connecting rod 41 is journalled in a bearing 43. The connecting rods 40 and 41 have been removed from Fig. 1 in the interest of clarity but they are shown in Fig. 3.

Spaced apart fixed frame assemblies 44 and 45 at each end of the device are supported by the guide rods 19, 20, and 21 as will be hereinafter described. Each of the fixed frame assemblies 44 and 45 supports, at its respective end, a centering guide bar 46. A sleeve member 47 is slidably mounted on each centering guide bar 46 and end portions of the connecting rods 40 and 41 are pivotally secured to the centering guide member 47, as by pivotal means 48. Also, each centering guide bar 46 is preferably supported at its outer end portion by a truss member 49.

As the weight of the assembly carried by the sleeves 32 counterbalances the weight of the assembly carried by the sleeves 34, an additional force is provided to urge the sleeves 32 and 34 toward each other. This may be in the nature of counterweights 50. A cable 51 is secured to each of the sleeves 32 and extends over a pulley 52 so that the effective moment of the counterweight 50 tends to urge the sleeves 32 toward the sleeves 34.

From the foregoing it will be apparent that I provide two spaced pulleys 35 at each end of the device and two spaced pulleys 33 therebelow at each end of the device. A conveyor belt 53 is mounted on pulleys 33 and a conveyor belt 54 is mounted on pulleys 35. Each of said conveyor belts 53, 54 carries a plurality of cleats 55. Coconuts are fed through the machine between conveyor belts 53 and 54, and are urged through the machine by the cleats 55 engaging behind coconuts 56 illustrated by the broken line figure in Fig. 3. Because of the counterweight 50 the upper lap of the lower conveyor belt 53 and the lower lap of the upper conveyor 54 are urged toward each other. As a coconut is positioned on the upper lap of the conveyor 53, is will pass between pulleys 33 and pulleys 35 and urge the same apart. As a coconut is somewhat oval in section, the spacing of pulleys 33 from each other and pulleys 35 from each other permits the coconut to be firmly grasped by the conveyor belts and urged through the machine by the cleats 55.

Referring now to Figs. 1 and 2 of the drawings, I have illustrated a means to synchronously drive shafts 30 and 31, and in turn, conveyors 53 and 54. A prime mover 57 drives shaft 58. Shaft 58 non-rotatably mounts sprocket 59. A driving chain 60 is mounted on sprockets 59 and 61. Sprocket 61 is non-rotatably on a shaft 31 located toward the discharge portion of the machine. Thus, shaft 31 may be driven in a suitable direction and cause the pulleys 35 and conveyor 54 to move in a suitable direction to cause coconuts to move from the feed in end toward the discharge end portion of the machine. At the same time, shaft 58 (see particularly Fig. 2) carries another gear 62 so as to cause travel of the jack shaft 63 in the opposite direction. Jack shaft 63 carries a gear 64 and also carries sprocket 65. A sprocket 66 is carried by shaft 30 (toward the discharge end portion of the machine) and chain 67 is threaded on sprockets 65 and 66.

Due to the fact there will be very little travel of the conveyors 53 and 54 toward and away from each other, as the sizes of coconuts will vary only a matter of inches, the relatively long chains 60 and 67 may have sufficient play therein to allow for the necessary movement.

The longitudinally extending fixed frame assemblies 44 and 45 each comprises longitudinally extending angle bars 68 secured together by corner members 69. The corner members 69 are rigidly secured to the guide rods 19, 20, and 21 by means of two removable plates 70, each held in place as by bolts 71. A plurality of rods 72 are slidably mounted in bearings 73 carried by angle bar 68. Springs 74 resiliently mount each rod 72 so that coconuts in passing by can urge the knives 75 and 76 outwardly. The knives 75 and 76 are pivotally mounted on rods 72 as by pivot means 77. Each of the rods 72 has a flange 78 rigid therewith and the springs 74 operate between said flange and a fixed portion carried by bearings 73. It is to be noted that two opposed knives 76 provide cutting edges which are substantially parallel with each other while the leading edges of the knives 75 have been spread apart by a coconut 56. Also it is to be noted that the rods 72, which support the leading edges of the knives 75, are provided with a slot 79 to compensate for the angular movement involved in plates 75. Also, it is to be noted that slots 80 are provided to compensate for the pivotal movement which will occur in the knives 76. The pivotal movement occurs as the coconuts, passing through the machine, vary in size.

The trailing end portions of the knives 75 are provided with bosses or ledges 81 and the leading edge portions of the knives 76 are provided with mating bosses or ledges 82. Whenever the trailing end portions of the knives 75 spread or move cross-wise of the machine, they will carry with them the leading edge portions of the knives 76. However, if a large coconut is disposed between the knives 76, the arrangement just described permits the knives 75 to accommodate a much smaller coconut. The purpose of the knives 75 and 76 is to center and hold a coconut for operations hereinafter described. Thus the knives 75 and 76 provide two parallel cuts through the husks of the coconut and up to the hard shell of the coconut. Also, said arrangement of knives permits a coconut of one size to be disposed between the knives 75 and a coconut of a larger or smaller size between the knives 76. However, the space between the leading edges of knives 76 is always sufficient to accommodate a given size coconut leaving knives 75.

The knives 75 and 76 are followed by another set of holding knives 83. The knives 83 hold the coconut as the husk is being pared therefrom as will be hereinafter described. The holding knives 83 are mounted for sidewise motion or movement toward and away from each other, and for forward motion by reason of stationary pins 85 and slots 84 in the knives 83. Resilient means are applied to urge the knives 83 toward each other. A rather schematic showing of the springs 85 is illustrated in Fig. 2 of the drawing. However, said springs 85 compare in tension to springs 74.

Due to the number of cleats 55 on the conveyors, a number of coconuts may be fed through the machine at the same time. In the illustrative showing in the drawings approximately four coconuts will be in the machine at all times and progressing through the machine, and being engaged by the knives 75, 76, and 83 successively.

The coconut paring mechanism is illustrated generally by 86 in Fig. 2 of the drawings, and the same is shown in detail in Figs. 5 and 6 of the drawings. Referring first to the illustration of the means for rotating the mechanism 86, the driven shaft 58 (see Figs. 1 and 2) non-rotatively carries a bevel gear 87. The bevel gear 87 meshes with bevel gear 88 which bevel gear 88 is in turn non-rotatively mounted on shaft 89. Shaft 89 carries the pulley 90 and the belt 91 is mounted on said pulley 90, and also on the pulley 92 carried by the coconut paring mechanism 86.

The annular ring 93 which has the pulley 92 therein is mounted for rotation by a plurality of rolls 94 supporting said ring 93 on its inner periphery. Each roll 94 is mounted on a shaft 95 and the shafts 95 are carried by stationary cylindrical support 96. The cylindrical support 96 is held in place by a bottom supporting frame 97 connected with base frame 10 and by a removable cap 98. This permits the cylindrical support 96 to be removed and parts carried thereby. The parts 97 and 98 may be secured together by the conventional bolt means indicated.

The annular ring 93 is bolted to a knife assembly member 99. The knife assembly member 99 carries three cutting knives 100, 101, and 102. The knife 100 is shown detached in Fig. 7 of the drawing, the knife 101 is shown detached in Fig. 8 of the drawing, and the knife 102 is shown detached in Fig. 9 of the drawing, and said knives are shown in side elevation in Fig. 5 of the drawing. The said knives are pivotally mounted on pins 103 carried by the knife assembly member 99. Also, each knife is spring loaded by a spring 104 connecting with lugs 105 carried by the knife assembly mounting member 99. Each of the knives 100, 101, 102 is mounted intermediate its length to provide lever arm portions 106 so that springs 104 can operate between the lever arms 106 and lugs 105. Thus, the tension of a spring 104 urges a knife cutting surface inwardly. Also, the lever arm portions 106 are somewhat weighted or in other words are much heavier than the portion of the knives on the other end portions opposite the fulcrums or pivot points 103. The knife assembly member 99 will be operated at speeds in the order of one hundred revolutions a minute, and hence the weight of each of the knife arm portions 106 functions through centrifugal force to further urge the point or cutting edges of the knives 100, 101, 102 inwardly and augment the spring tension obtaining from springs 104.

Also, stop members 107 are provided and the same may be secured to the lugs 105 and thus they are engaged by said knives and limit inward movement of the cutting edges of the knives. In other words, the position shown in Fig. 5 of the drawings is a normal position and the cutting edge portions of the knives have reached their most inward position.

As the leading end portion of a coconut reaches knife 100, the knife 100 forms a helical cut (see particularly Fig. 10) and knife 101 follows in the same helical path. It is to be noted that the knife 101 has an arcuate portion 108, and the same breaks the helical portion 109 away from the remaining husk portion 110 of the coconut. The action is much like the first movement caused by a plow in breaking sod away from unplowed ground. Following the action of knife 101, the knife 102 has the scraper-like end portion 111 which scrapes or cuts away the helical strip 109 which is caused by the cutting action of knife 100 and the breaking-away action of knife 101.

After a pre-determined amount of cutting away of a helical strip 109, the peeled end of the coconut or the hard shell of the coconut is engaged by coconut centering mechanism illustrated generally by 112 in Figs. 2 and 3 and shown more specifically in detail in Figs. 4 and 6. The said centering mechanism comprises a plurality of cylindrical members 113 and cap members 114, each of which threadedly engages a cylindrical member 113. A closed cylindrical member 115 threadedly engages each cap 114. Each cap 114 is provided with a sleeve 116 to slidably mount a round rod portion 117. The same rod has a square portion 118 or other shape to prevent rotation of the shaft 117—118. Sleeve members 119 are provided for assembly purposes and to secure the cylindrical member 113 to cylindrical support 96. Also, said sleeves 119 slidably and non-rotatably support the rod portion 118 and the inner surface thereof has a mating portion with square rod portion 118. Also, preferably a bearing 120 is mounted on cylindrical portion 96 to aid in non-frictionally supporting the rod 117, 118. A flange 121 is fixed to the rod portion 118 and functions to engage a leather stop 122 to limit inward movement of the rod 117—118, and also functions as an abutment to engage spring 123. Each spring 123 functions between flange 121 and sleeve 116. Each rod portion 118 at its inner end portion rotatably supports a toothed wheel 124. The toothed wheels 124 are symmetrically positioned and are urged inwardly with substantially equal spring tension so they will tend to center, engage and hold a coconut, and provide counter-pressure resisting forward motion of the coconuts.

As the knives 100, 101, and 102 are operating to cut the husks from a coconut, the advancing end of the coconut is progressively grasped and prevented from turning by the toothed wheels 124. The toothed wheels 124, being spring loaded, can follow the contour of the coconut and thus they first engage the advancing end portion and finally they grip the coconut as the trailing end portion thereof is being engaged by the knives 100, 101, and 102.

After a given coconut is no longer urged forward by cleats 55 on conveyors 53 and 54, further forward movement is resisted by toothed wheels 124 and associated parts. The next succeeding coconut will abut against said given coconut and urge it past cutters 100, 101, 102 and past toothed wheels 124.

As a safety device and to prevent sudden inward movement of the toothed wheels 124 by reason of the springs 123, I provide the cylindrical member 115 which is provided with a cup leather piston like member 125. A restricted aperture 126 is provided in the cylindrical member 115 and inward and outward movement of the cup leather piston like member 125 is limited by inflow or exit of air through the restricted orifice 126. This restricted movement of the cup like piston member 125 is translated to restricted movement of the rod portions 117, 118 and in turn, the toothed wheels 124.

From the foregoing, it will now be apparent that a coconut is carried through the device on and by the conveyors 53—54; a groove is provided in the husks of a coconut and such groove provides means so that the knives 83 can rest therein and hold the coconut as the knives 100, 101, 102 peel a helical strip from the coconut husk. Then the hard shell of the coconut is engaged by the toothed wheels 124 and they center, engage and hold the coconut while the knives cut the remaining husk away from the coconut. After the coconut has been so peeled of its husk, it passes out of the machine through the exit portion of the cylindrical member 96.

In a general way, my invention is a coconut conveyor. The said conveyor comprises laterally spaced pulleys 35 and a conveyor belt 54 on each of said pulleys. The belts of the top conveyor are interconnected by cleats 55. Similarly, the bottom conveyor comprises laterally spaced pulleys 33, belts 53 on said pulleys, and cleats 55, which tie said spaced apart belts 53 together.

The before-mentioned conveyor system is employed not only to advance the coconuts through the machine but is designed as a means to center the coconuts. The top conveyor and the bottom conveyor are mounted for movement toward and away from each other, and this movement is synchronized so that regardless of the size of a coconut, its medial plane horizontally considered as it passes through the machine will be the medial plane between the top and bottom conveyors.

The knife means 75 and 76 provided centering incisions and knife 83 provides for maintaining a coconut centered as the husk is pared by the knives 100, 101, and 102. As indicated, preferably the knives are in sections so the device will accommodate coconuts traveling therethrough of varying sizes. Also, preferably, the knife section comprising blades 75 is provided with the abutment 81 which engaged during outward movement with the abutment 82 carried by the knife section comprising blades 76. Thus, as the coconut leaves the knife section 75, it spreads the trailing end portions of the knife blades 75 to a size to accommodate that particular coconut. At the same time, the said abutments 81 and 82 function to spread the leading end portions of the knife section comprising knives 76 and thus said knives 76 are spaced apart a desired distance to receive a particular coconut.

The knives 75 and 76 are spring loaded and preferably by the use of rods 72 bearings 73 and springs 74. Also, one of the rods 72 going to a given end portion of either a knife 75 or 76 loosely fits therewith as by a slot 79 or 80 to allow rocking movement of a knife blade when this obtains because of varying sizes of coconuts passing through the device at the same time.

Preferably, the knives 83 are mounted for movement toward and away from each other and at the same time, for movement toward the cutting knives 100, 101, and 102. This is indicated as being accomplished by slots 84 in the knives 83 and pins 85 carried by the frame structure.

While a coconut is being held by knives 83, the cutting knives 100, 101, and 102 operate successively to provide a helical strip of coconut husk, break the same away from the remaining coconut husk, and cut or chisel away the said helical strip of coconut husk.

The knife portion 108 of the knife 101 is arcuate as respects the plane of cutting of the knife, or in other words, is offset so as to break the helical portion or strip 109 away from the remaining portion of the coconut husk. On the other hand, the chisel-like knife portion 111 of the cutter 101, extends crosswise or transversely of its plane of cutting.

As the hard shell portion of the coconut leaves the cutter knives 100, 101, and 102, it engages with the toothed wheels 124 which function as centering means, holding means preventing the coconut from rotating and a holdback means. Thus, after a coconut is no longer urged forward by the conveyor means, the toothed wheeled members 124 hold the same back until a succeeding coconut urges the said preceding coconut past the knives 100, 101, and 102 and past the toothed wheels 124.

The toothed wheels 124 and parts associated therewith thus function as second coconut centering and holding means. The said second holding means comprises rods 117—118 and the same are radially disposed and are mounted for reciprocating movement toward and away from a common center. This common center is the center of the knife assembly ring member 99. The rods 117—118 are spring loaded by springs 123, urging the rods toward said common center.

Also, the movement of the rods 117—118 is dampened by means of the cup leather piston 125, the cylindrical member 115, and the restricted orifice 126. Preferably the rods 117—118 are angularly disposed and are directed toward the knife assembly. This allows the wheels 124 to be placed as close as possible to the cutting knives 100, 101, 102.

Preferably, the knives 100, 101, and 102 are of the shape in side elevation as indicated in Figs. 10 5 of the drawing wherein they have hook-like cutting portions, are mounted intermediate their length on pivot means 103, carried by knife assembly ring member 99, and said knives have the lever arm portions 106. The lever arm portions 106 may be sufficiently weighted so that centrifugal force will cause them to move outwardly and thus cause the cutting edge portions of knives 100, 101, and 102 to move inwardly.

Also, preferably springs 104 are employed for urging the cutting edges of the knives 100, 101, and 102 toward the center of the knife assembly ring members 99.

Obviously, changes may be made in the form dimensions and arrangement of the parts of my invention without departing from the principle thereof, the above setting forth only preferred forms of embodiment for my invention.

I claim:

1. In a coconut husking device a conveyor; spaced apart and longitudinally positioned knives disposed in the path of coconuts on said conveyor and mounted for movement toward and away from other; resilient means urging said knives inwardly and into the husks of coconuts, said resilient means comprising spaced apart rods pivotally secured to each knife, one of said pivotal means comprising a pin and an elongated slot in which said pin can travel, sleeve means mounting said rods for reciprocating movement, and resilient means urging said rods and said knives toward each other; coconut holding means receiving a coconut from knives; and rotating cutting knives cutting husk away from the coconut hard shell while the coconut is held by said coconut holding means.

2. In a coconut husking device, coconut guide and holding means adapted to progressively and uniformly advance and hold coconuts against rotary movement; a first husking knife means mounted for rotary movement in a given plane and around coconuts passing through said plane and thereby adapted to cut a helical path in the husk of a coconut; and second husking knife means mounted for rotary movement in a given plane and around coconuts passing said plane and having a chisel-like cutting portion to cut away the helical strip portion of the husk of a coconut formed by the first husking knife means.

3. The combination of claim 2 wherein the second husking knife means comprises a first knife having a blade portion of arcuate shape as respects its plane of cutting; and a second knife having a chisel-like blade portion extending transversely of its plane of cutting.

4. The combination of claim 2 wherein the second husking knife means comprises a first knife having a blade portion which is offset as respects its plane of cutting; and a second knife having a chisel-like blade portion extending transversely of its plane of cutting.

5. In a coconut husking device; a conveyor spaced apart knife means disposed in the path of coconuts on said conveyor, said knife means comprising a plurality of aligned knife sections, each section including knives mounted for independent movement toward and away from knives in the other section; abutments carried by the trailing end portions of the knives of a leading knife section and abutments carried by the end portions of the knives of the preceding section positioned in the path of travel of the first mentioned abutments so that the trailing end portions of said leading knife section moves the leading end portion of the preceding section outwardly; resilient means urging said knives inwardly and into the husks of coconuts; and rotating cutting knives cutting husk away from the coconut hard shell while the coconut is held by the knife of one of said knife sections.

6. In a coconut husking device a conveyor; spaced apart knife means disposed in the path of coconuts on said conveyor, said knife means comprising a plurality of aligned knife sections, each including knives mounted for independent movement toward and away from knives in the other section; resilient means urging said knives inwardly and into the husks of coconuts; and rotating cutting knife means cutting a continuous helical incision in the coconut husk; and second knife means on said rotating cutting knife means chiseling husk away from the coconut hard shell while the coconut is held by the knives of one of said knife sections.

ARNOLD H. BEEKEN.

References Cited in the file of this patent

UNITED STATES PATENTS

| Number | Name | Date |
| --- | --- | --- |
| 249,990 | Pursley | Nov. 22, 1881 |
| 983,631 | Marot | Feb. 7, 1911 |
| 1,248,856 | Henry | Dec. 4, 1917 |
| 1,282,788 | Fenn | Oct. 29, 1918 |
| 1,319,810 | Starr | Oct. 28, 1919 |
| 1,374,899 | Baker | Apr. 19, 1921 |
| 1,645,600 | Kohler | Oct. 18, 1927 |
| 1,921,238 | Milam | Aug. 8, 1933 |
| 2,212,071 | Morral et al. | Aug. 20, 1940 |
| 2,561,069 | Peterson | July 17, 1951 |
| 2,577,530 | Kerr | Dec. 4, 1951 |

FOREIGN PATENTS

| Number | Country | Date |
| --- | --- | --- |
| 28,438 | Great Britain | Dec. 9, 1913 |